(12) United States Patent
Matsukura

(10) Patent No.: US 10,929,828 B2
(45) Date of Patent: Feb. 23, 2021

(54) INFORMATION PROCESSING APPARATUS AND INFORMATION PROCESSING METHOD

(71) Applicant: TOSHIBA TEC KABUSHIKI KAISHA, Tokyo (JP)

(72) Inventor: Yui Matsukura, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 448 days.

(21) Appl. No.: 15/815,110

(22) Filed: Nov. 16, 2017

(65) Prior Publication Data
US 2018/0137494 A1    May 17, 2018

(30) Foreign Application Priority Data

Nov. 17, 2016 (JP) .............................. JP2016-223763

(51) Int. Cl.
*G06Q 20/20*  (2012.01)
*G06Q 30/04*  (2012.01)
*G06Q 30/02*  (2012.01)
*G06Q 20/00*  (2012.01)

(52) U.S. Cl.
CPC ........... *G06Q 20/207* (2013.01); *G06Q 20/00* (2013.01); *G06Q 20/201* (2013.01); *G06Q 20/208* (2013.01); *G06Q 30/0208* (2013.01); *G06Q 30/04* (2013.01)

(58) Field of Classification Search
CPC .... G06Q 20/207; G06Q 20/00; G06Q 20/201; G06Q 20/208; G06Q 30/04; G06Q 30/0208
See application file for complete search history.

(56) References Cited

U.S. PATENT DOCUMENTS 3,959,624 A * 5/1976 Kaslow .............. G06K 7/10871
235/487

FOREIGN PATENT DOCUMENTS

| JP | H02-299096 A | 12/1990 |
|---|---|---|
| JP | H0512565 A * | 1/1993 |
| JP | H10-283570 A | 10/1998 |
| JP | 2003-272055 A | 9/2003 |
| JP | 2005-284759 | 10/2005 |

(Continued)

OTHER PUBLICATIONS

Japanese Notice of Reasons for Refusal dated May 26, 2020 in counterpart Japanese Patent Application No. 2016-223763, 4 pages (with Machine Translation).

(Continued)

*Primary Examiner* — Florian M Zeender
*Assistant Examiner* — Joseph M Mutschler
(74) *Attorney, Agent, or Firm* — Kim & Stewart LLP

(57) ABSTRACT

According to an embodiment, an information processing apparatus that processes information on a product to be traded includes an input device, a memory, and a processor. The processor stores, for each tax rate in the memory, the total price in a trade of a product to which reduction is applied, the product being identified by a product code input by the input device. The processor calculates the amount of tax of the product to be traded on the basis of the total price of a product taxed with a specific tax rate after the reduction processing and the total price of a product taxed with a tax rate other than the specific tax rate.

1 Claim, 12 Drawing Sheets

(56) References Cited

FOREIGN PATENT DOCUMENTS

| | | | |
|---|---|---|---|
| JP | 2008-070970 A | | 3/2008 |
| JP | 2015049528 A | * | 3/2015 |
| JP | 2017211865 A | * | 11/2017 |

OTHER PUBLICATIONS

Japanese Notice of Reasons for Refusal dated Jun. 2, 2020 in counterpart Japanese Patent Application No. 2019-171519, 4 pages (with Machine Translation).

Commissioner of National Tax Agency, "Regarding the establishment of a handling notice regarding the reduced tax rate system for consumption tax (Notice of Interpretation of Law)", Apr. 12, 2016, 10 pages, URL: https://www.nta.go.jp/law/tsutatsu/kobetsu/kansetsu/160412/index.htm.

Japanese Decision of Refusal dated Aug. 18, 2020 mailed in counterpart Japanese Patent Application No. 2016-223763, 4 pages (with Machine Translation).

Japanese Decision of Refusal dated Aug. 18, 2020 mailed in counterpart Japanese Patent Application No. 2019-171519, 4 pages (with Machine Translation).

* cited by examiner

TO WHICH PRODUCT DO YOU WANT TO APPLY DISCOUNT TICKET ?

DISCOUNT TICKET A — 41a

41b

| PRODUCT NAME | PRICE | TAX RATE | PRODUCT TO WHICH DISCOUNT TICKET CAN BE USED TAX RATE |
|---|---|---|---|
| PRODUCT A | 100 YEN | 1 | SELECT — 41c |
| PRODUCT B | 200 YEN | 2 | SELECT — 41c |
| PRODUCT C | 150 YEN | 1 | SELECT — 41c |
| PRODUCT D | 250 YEN | 2 | SELECT — 41c |
| PRODUCT E | 300 YEN | 2 | SELECT — 41c |

Fig.5

INFORMATION PROCESSING APPARATUS AND INFORMATION PROCESSING METHOD

CROSS-REFERENCE TO RELATED APPLICATIONS

This application is based upon and claims the benefit of priority from the prior Japanese Patent Application No. 2016-223763, filed on Nov. 17, 2016, the entire contents of which are incorporated herein by reference.

FIELD

An embodiment to be described here generally relates to an information processing apparatus and an information processing method.

BACKGROUND

In the past, when paying the purchase price of a product, a customer sometimes uses a price reduction ticket, a discount ticket, or the like. When the customer uses a price reduction ticket or a discount ticket, a predetermined amount of money (e.g., the amount of money displayed on the price reduction ticket) is reduced from the total price of the product. Alternatively, an amount of money corresponding to a predetermined rate (e.g., the rate displayed on the price reduction ticket) is reduced from the total price of the product.

Meanwhile, due to, for example, the introduction of the reduced tax rate, different tax rates are applied to the total price of the product depending on the product in some cases. Further, even for the same product, different tax rates are applied to the total price of the product in some cases depending on whether the product is eaten on the spot or taken out. In this case, by calculating the total price of products for each tax rate and multiplying the total price of the products for each tax rate by the corresponding tax rate, the amount of tax is calculated for each total price of the products with different tax rates.

In the case of using a price reduction ticket or a discount ticket for purchasing such a plurality of products with different tax rates, a customer has reduced the amount of money corresponding to the price reduction amount or discount rate from the above-mentioned total price for each tax rate by using a calculator or the like, and calculated the respective amounts of tax on the basis of the total price after the reduction. For this reason, it has taken time and burden for the customer to calculate the amount of tax. In the above-mentioned calculation of the amount of tax, a calculation error has occurred in some times.

BRIEF DESCRIPTION OF THE DRAWINGS

FIG. 5 is a diagram showing an example of a display screen displayed on an operation panel of a server according to this embodiment;

DETAILED DESCRIPTION

Figure 1:
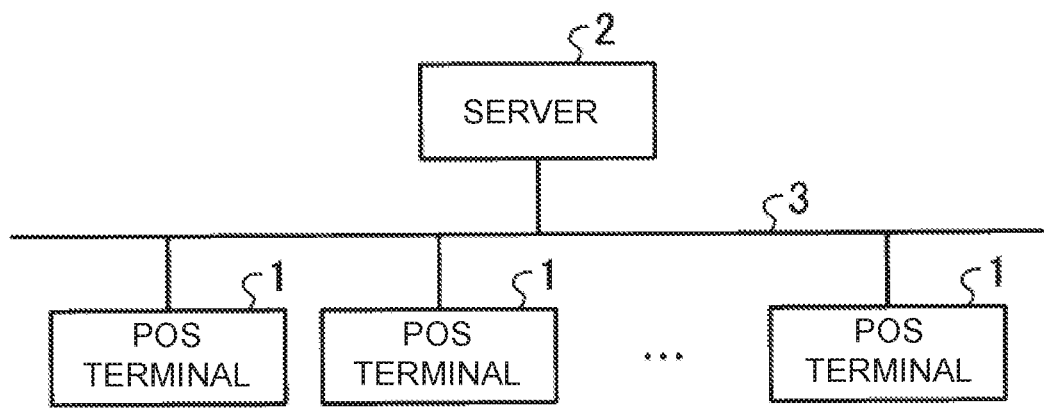
FIG. 1 is a schematic diagram showing a POS system according to an embodiment.

According to an embodiment, an information processing apparatus that processes information on a product to be traded includes an input device, a memory, and a processor. The input device inputs a product code for identifying the product to be traded and reduction information on the product to be traded. The reduction information includes a reduction amount to be reduced from a price of the product to be traded. The memory includes a first total area that stores a total price in a trade of a product to be taxed with a first tax rate, and a second total area that stores a total price in the trade of a product to be taxed with a second tax rate. The first tax rate is a specific tax rate, and the second tax rate being different from the first tax rate. The processor is configured to add, under conditions that the product code is input by the input device and the reduction is to be applied to the product identified by the product code, a price of the product identified by the product code to the total price already stored in the first total area or the second total area depending on the tax rate for the product, and store the resultant price in the first total area or the second total area. The processor is further configured to execute, under a condition that the reduction is instructed, first reduction processing of reducing the reduction amount included in the reduction information from the total price stored in the first total area. The processor is further configured to calculate an amount of tax of the product to be traded on the basis of the total price of the product to be taxed with the first tax rate after the first reduction processing and the total price stored in the second total area.

Hereinafter, with reference to the drawings, an embodiment will be described in detail. In the drawings, the same reference symbols indicate the same or similar portions. In this embodiment, a POS (Point of Sales) terminal will be described as an example of an information processing apparatus. Note that the information processing apparatus and the information processing method are not limited to the embodiment described below.

FIG. 1 is a schematic diagram showing a POS system according to this embodiment. The POS system is a system that executes sales management and the like of products to be sold at a store, and is installed mainly in the store. The POS system includes a plurality of POS terminals 1 installed in the store and one server 2 installed in the backyard of the store. The POS terminal 1 and the server 2 are electrically connected to each other via a communication line 3 such as a LAN (Local Area Network). Therefore, the POS terminal 1 and the server 2 can transmit/receive information to/from each other.

The POS terminal 1 executes sales registration processing and settlement processing of products to be sold in the store. The sales registration processing includes processing of acquiring a product code by optically reading a symbol or an image of a symbol such as a bar code attached to a product to be sold in a trade with a customer. Further, the sales registration processing includes processing of reading, on the basis of the acquired product code, product information (product name, price, and the like) of the product from a product master to be described later, displaying the read product information, and storing the product information in a RAM or the like. The settlement processing includes processing of displaying the total price relating to the trade, processing of calculating and displaying the change on the basis of the payment received from the customer, and processing of instructing a change machine to issue change, on the basis of the product information stored in the RAM or the like accompanying the sales registration processing. Further, the POS terminal 1 executes processing of printing the product information and settlement information (total price, payment amount, change amount, and the like) after the settlement processing on a receipt, and issuing the receipt.

The POS terminal 1 transmits product information and settlement information of the settled product to the server 2 via the communication line 3. Further, the POS terminal 1 transmits clearance information on the sales in a predetermined period of time (e.g., one day) to the server 2 via the communication line 3.

The server 2 intensively manages product information, settlement information, reduction information, amount-of-tax information, clearance information, and the like received from each POS terminal 1. Further, the server 2 transmits information on a latest product master 142 (see FIG. 4) to each POS terminal 1. Further, the server 2 displays a screen (see FIG. 5) for selecting a product targeted for a discount ticket, and accepts selection of a product to be discounted (reduced).

In the following description, reduction processing includes discount processing and price reduction processing of reducing (subtracting) a predetermined amount of money (reduction amount) from the total price of the prices of products sold in one trade. For example, the reduction processing includes processing of reducing a predetermined amount of money (reduction amount) from the total price. Further, the reduction processing includes processing of reducing an amount of money corresponding to a predetermined rate (reduction amount) from the total price, for example. The discount ticket is a ticket used for executing reduction processing of reducing a predetermined amount of money (reduction amount) from the total price in one trade. The discount ticket includes, for example, a price reduction ticket and a coupon ticket. In the trade of this embodiment, using the discount ticket or the like by a customer corresponds to an instruction of the reduction.

For example, in the case where a reduction amount is displayed on the discount ticket, reduction processing due to use of the discount ticket includes processing of reducing the amount of money displayed on the discount ticket from the total price of the product. For example, in the case where "100 yen OFF" is displayed on the discount ticket, reduction processing due to use of the discount ticket includes processing of reducing 100 yen from the total price of the product. Further, in the case where a discount rate is displayed on the discount ticket, reduction processing due to use of the discount ticket includes processing of reducing an amount of money corresponding to the rate displayed on the discount ticket from the total price of the product. For example, in the case where "10% OFF" is displayed on the discount ticket, reduction processing due to use of the discount ticket includes processing of reducing an amount of money corresponding to 10% of the total price from the total price of the product.

On the discount ticket in this embodiment, a reduction amount is displayed. Further, on the discount ticket, a symbol such as a bar code is printed. This symbol includes reduction information such as a reduction amount. The POS terminal 1 inputs, by reading a symbol displayed on the discount ticket by using a code reader (see FIG. 2) to be described later, reduction information including a reduction amount and the like in the case where the discount ticket is used.

Figure 2:
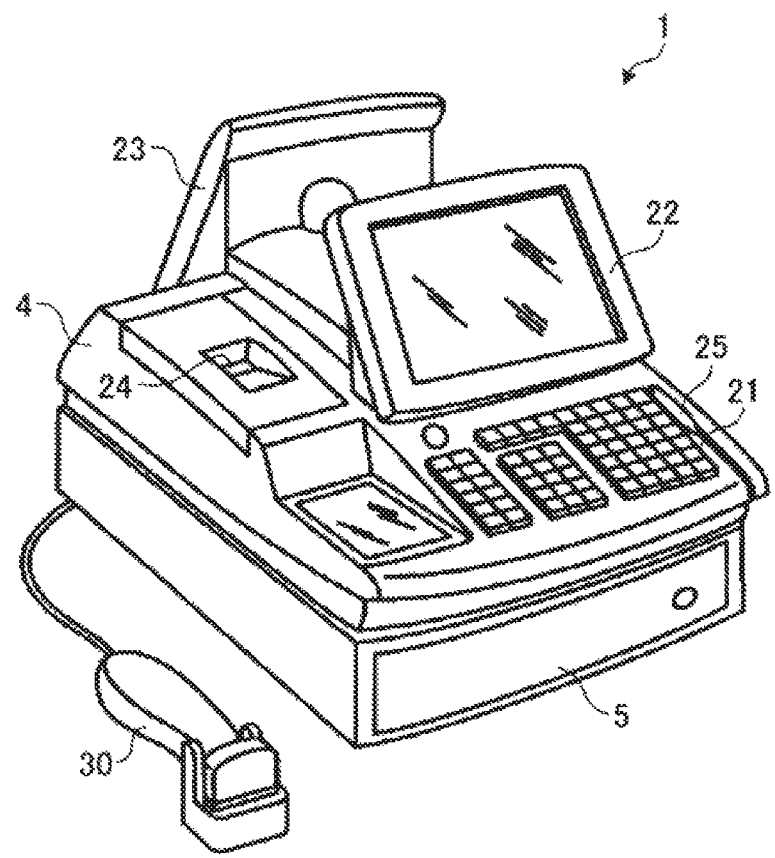
FIG. 2 is a perspective view showing a POS terminal 1 according to this embodiment seen from the side of an operator.

FIG. 2 is a perspective view showing the POS terminal 1 according to this embodiment seen from the side of an operator.

The POS terminal 1 includes a main body 4 and a cash box 5. The cash box 5 includes a drawer for storing money, and stores money such as bill and currency, securities such as gift certificates, change to be given to customers, and the like received from a customer.

The main body 4 includes an operation device 21, an operator display device 22, a customer display device 23, a printing device 24, a card reading device 25, and an input device 30. The operation device 21 includes a keyboard including keys such as a numeric key for entering numbers and a settlement key 211 for declaring the end of sales registration (see FIG. 3). The operator display device 22 includes a liquid crystal display and the like, and displays product information, settlement information, reduction information, and the like, for the operator. The customer display device 23 includes a liquid crystal display and the like, and displays product information, settlement information, reduction information, and the like, for a customer.

The printing device 24 stores roll-shaped receipt paper in the main body 4. The printing device 24 is, for example, a thermal printer including a thermal transfer print head. The printing device 24 pulls out the roll-shaped receipt paper, prints product information, settlement information, reduction information, and the like on the receipt paper by using a thermal printer or the like, and issues the printed receipt paper as a receipt. The card reading device 25 reads card information from a card such as a credit card presented by a customer. The input device 30 is, for example, a handy type code reader. Hereinafter, the input device 30 will be referred to as the code reader 30. The code reader 30 inputs a product code for identifying the product, and reduction information on the product. Specifically, the code reader 30 optically reads a symbol attached to a product or a discount ticket by using visible light, for example. Note that the code reader 30 may read a symbol from a captured image.

Figure 3:
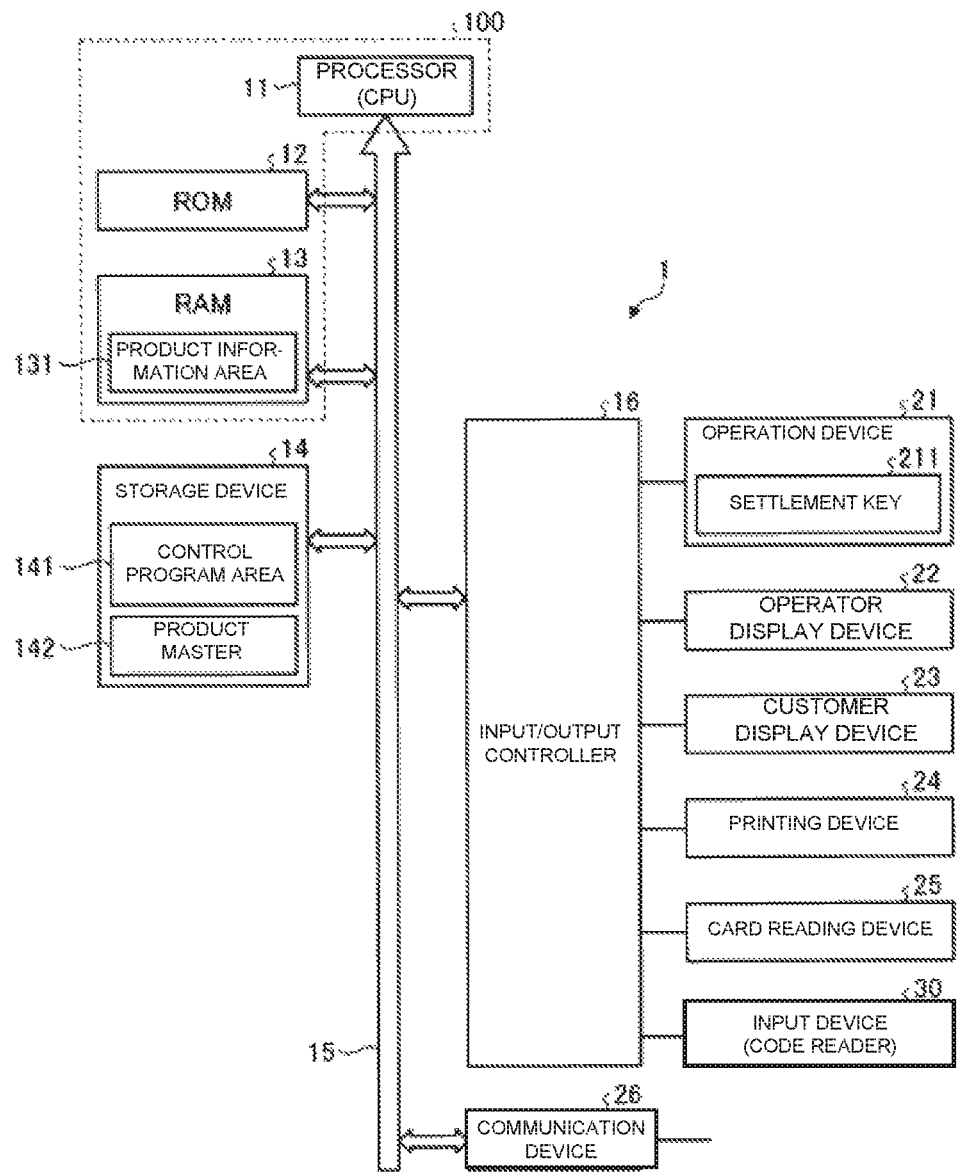
FIG. 3 is a block diagram showing a hardware configuration of the POS terminal according to this embodiment.

Next, a hardware configuration of the POS terminal 1 will be described. FIG. 3 is a block diagram showing a hardware configuration of the POS terminal 1. As shown in FIG. 3, the POS terminal 1 includes a controller 100. The controller 100 includes a processor 11. The processor 11 is, for example, a CPU (Central Processing Unit). Further, the controller 100 includes a ROM (Read Only Memory) 12 and a RAM (Random Access Memory) 13. Further, the controller 100 is connected to a storage device 14 via a bus 15. The processor 11 functions as a control subject. The ROM 12 stores various programs. The RAM 13 develops programs and various types of data. The storage device 14 stores various programs. The processor 11, the ROM 12, and the RAM 13 are connected to each other via the bus 15. Specifically, the processor 11 of the controller 100 executes control processing relating to the POS terminal 1 to be described later by operating in accordance with a control program that is stored in the ROM 12 or the storage device 14 and loaded into the RAM 13.

The RAM 13 includes a product information area 131. The product information area 131 stores product information (product name, price of the product, tax rate, reduction information, and the like) of a product on which sales registration processing is executed. As described above, the sales registration processing is executed on the basis of a product code obtained from a symbol read by the code reader 30.

The storage device 14 includes an HDD (Hard Disc Drive) or a non-volatile memory such as a flash memory in which stored information is retained even when the power is turned off. The storage device 14 stores a control program area 141 and the product master 142. The control program area 141 stores a control program for controlling the POS terminal 1. The product master 142 stores, for each product, information on the product (details will be described with reference to FIG. 4).

Further, the processor 11 of the controller 100 is connected to the operation device 21 including the settlement key 211, the operator display device 22, the customer display device 23, the printing device 24, the card reading device 25, and the code reader 30 via the bus 15 and an input/output controller 16. When receiving an instruction from the processor 11 of the controller 100, the input/output controller 16 controls the operation device 21, the operator display device 22, the customer display device 23, the printing device 24, the card reading device 25, and the code reader 30. Note that in the following description, the control process executed by the input/output controller 16 is included in the control process executed by the processor 11 of the controller 100 in order to make the description easy to understand.

Further, the processor 11 of the controller 100 is connected to a communication device 26 via the bus 15. The communication device 26 is electrically connected to another POS terminal 1 installed in the store and the server 2 via the communication line 3.

Next, the product master 142 of the storage device 14 will be described. The product master 142 is a storage unit that stores, for each product, product information. The product master 142 stores information on reduction processing to be described later (reduction application information). The processor 11 of the controller 100 displays the product information read from the product master 142 in the operator display device 22 and the customer display device 23. Further, the processor 11 of the controller 100 executes sales registration processing and settlement processing on the basis of the product information read from the product master 142.

Figure 4:
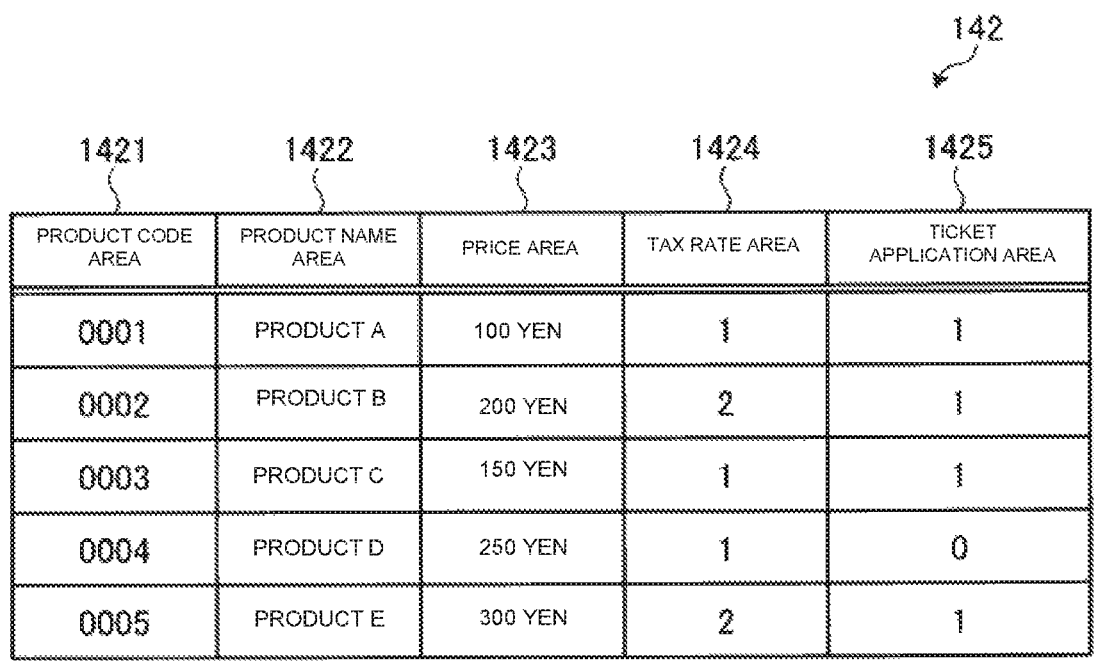
FIG. 4 is a memory map showing a part of a configuration of a product master according to this embodiment.

FIG. 4 is a memory map showing a part of a configuration of the product master 142. As shown in FIG. 4, the product master 142 includes a product code area 1421, a product name area 1422, a price area 1423, a tax rate area 1424, and a reduction application area (hereinafter, referred to as the discount ticket application area) 1425. In the product code area 1421, a product code for identifying each product is stored. In the product name area 1422, a product name of a product identified by the product code is stored. In the price area 1423, a price of a product identified by the product code is stored. In this embodiment, the price stored in the price area 1423 is the base price of the product, which does not include the amount of tax such as consumption tax.

In the tax rate area 1424, a tax rate applied to taxation is stored corresponding to a product identified by the product code. In the case of this embodiment, to ordinary products, a predetermined tax rate A (e.g., tax rate of 10%) that is a first tax rate is applied as a consumption tax, for example. Then, "1" is stored in the tax rate area 1424 corresponding to this ordinary product. That is, the amount of tax calculated on the basis of the tax rate A is taxed on the ordinary product for which "1" is stored in the tax rate area 1424. Further, to products to which the reduced tax rate is applied, a predetermined tax rate B (e.g., tax rate of 8%) that is a second tax rate lower than the tax rate A is applied. Then, "2" is stored in the tax rate area 1424 corresponding to the products to which the reduced tax rate is applied. That is, the amount of tax calculated on the basis of the tax rate B is taxed on the product for which "2" is stored in the tax rate area 1424. In the case of this embodiment, a product A, a product C, and a product D are ordinary products, and taxed by applying the tax rate A. Meanwhile, a product B and a product E are products to which the reduced tax rate is applied, and taxed by applying the tax rate B. In this embodiment, the tax rate A that is the highest tax rate is defined as a specific tax rate in advance. Further, the tax rate B corresponds to a tax rate other than the specific tax rate. Further, the tax rate A and the tax rate B correspond to a plurality of different tax rates.

In the discount ticket application area 1425, a flag that is reduction application information representing presence/absence of application of a discount ticket is stored corresponding to a product identified by the product code. The flag of "1" represents that the discount ticket is applied, and the flag of "0" represents that the discount ticket is not applied. In the case of this embodiment, the discount ticket is applied to the product A, the product B, the product C, and the product E, and the discount ticket is not applied to the product D. As will be described with reference to FIG. 5, this flag is stored in the discount ticket application area 1425 by being input from the server 2. The flag is information representing that the above-mentioned reduction application information is a target for reduction.

Next input of reduction application information of a discount ticket will be described. The server 2 includes an operation panel 41 and a touch panel 42 provided on the operation panel 41. A clerk or manager of the store operates the touch panel 42 and inputs presence/absence of application of a discount ticket for each product displayed on the operation panel 41. FIG. 5 is a diagram showing an example of a display screen displayed on the operation panel 41 of the server. The operation panel 41 of the server 2 displays a type 41a of a discount ticket to be applied. Further, the operation panel 41 displays, for each product, product information (product name, price, tax rate) 41b. Further, the operation panel 41 displays a selection button 41c at a position corresponding to each product. The selection button 41c receives selection of whether to apply a discount ticket or not by being operated by the clerk or manager of the store. When the selection button 41c is operated by the operator, a flag "1" is stored in the corresponding discount ticket application area 1425 of the product master 142 for the product corresponding to the selection button 41c. That is, in the product master 142, applying the discount ticket to the product is stored. A flag "0" is stored in the corresponding discount ticket application area 1425 of the product master 142 for the product corresponding to the selection button 41c that is not operated. That is, in the product master 142, not applying the discount ticket to the product is stored. Note that the operation of the selection button 41c by the clerk or manager of the store is executed by touching the touch panel 42 at the position corresponding to the selection button 41c displayed on the operation panel 41. Note that the POS terminal 1 may include the above-mentioned touch panel 42.

Next, the product information area 131 of the RAM 13 will be described. The product information area 131 stores product information on a product on which the sales registration processing is executed. Further, the product information area 131 stores, for each tax rate, the total price of the product on which sales registration processing is executed, which does not include the amount of tax. Further, the product information area 131 stores the total price of the product on which sales registration processing is executed, which does not include the amount of tax. Further, the product information area 131 stores reduction information. As described above, the code reader 30 reads the symbol displayed on the discount ticket, thereby inputting this reduction information.

Figure 6:
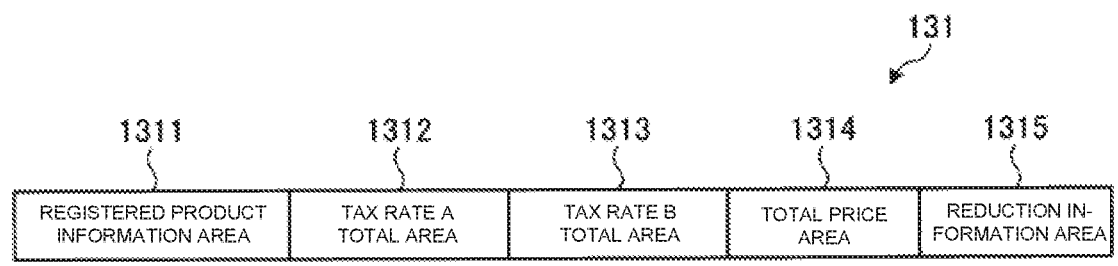
FIG. 6 is a memory map showing a part of a product information area according to this embodiment.

FIG. 6 is a memory map showing a part of the product information area 131. The product information area 131 includes a registered product information area 1311, a tax-rate-A total area (first total area) 1312, a tax-rate-B total area (second total area) 1313, a total price area 1314, and a reduction information area 1315. In the registered product information area 1311, product information of a product on which sales registration processing is executed is stored. In the tax-rate-A total area 1312, the total price of the product to which the tax rate A is applied in the product master 142, which does not include the amount of tax, is stored. In the tax-rate-B total area 1313, the total price of the product to which the tax rate B is applied in the product master 142, which does not include the amount of tax, is stored. In the total price area 1314, the total price of the product on which sales registration processing is executed, which does not include the amount of tax, is stored. In the reduction information area 1315, reduction information including the amount of money to be reduced in the case where a discount ticket whose symbol is read by the code reader 30 is used is stored.

Figure 7:
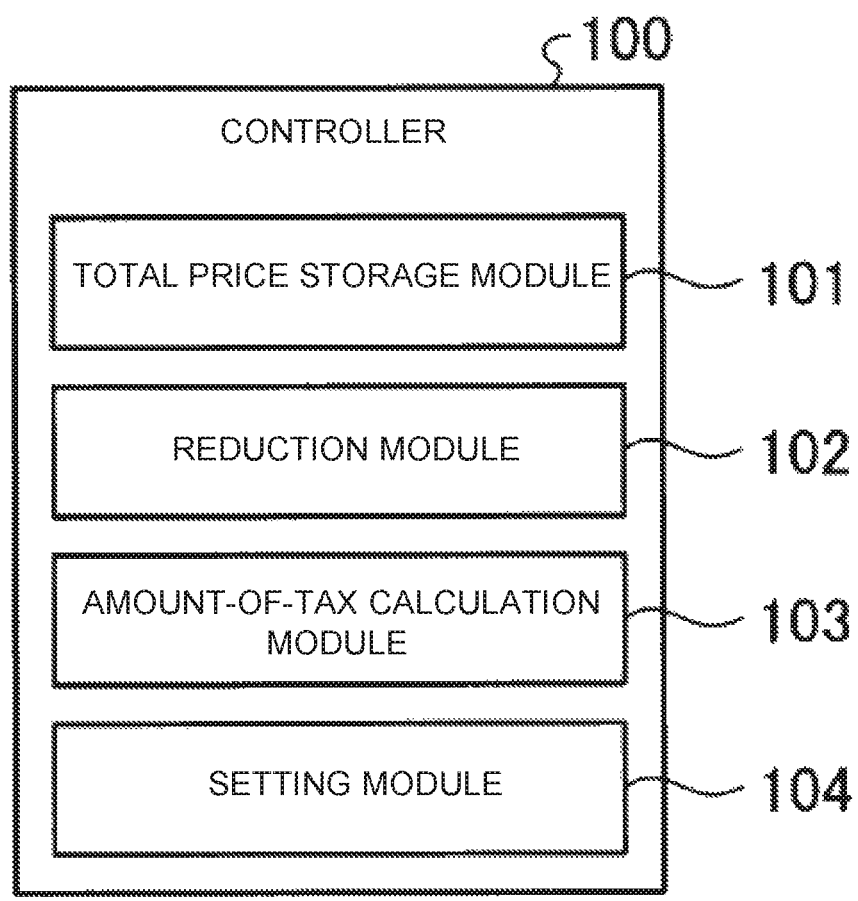
FIG. 7 is a block diagram showing a functional configuration of the POS terminal according to this embodiment.

Hereinafter, control of the POS terminal 1 will be described in detail. FIG. 7 is a block diagram showing a functional configuration of the processor 11 of the controller 100. By operating in accordance with a control program stored in the ROM 12 or the control program area 141 of the storage device 14, the processor 11 functions as a total price storage module 101, a reduction module 102, an amount-of-tax calculation module 103, and a setting module 104.

The total price storage module 101 stores, for each of a plurality of different tax rates taxed on products, the total price of a product to be traded. Specifically, the total price storage module 101 stores, in the tax-rate-A total area 1312, the total price of the product of the tax rate A among the plurality of different tax rates. Further, the total price storage module 101 stores the total price of the product of the tax rate B in the tax-rate-B total area 1313.

Under the condition that reduction (discount) is instructed, i.e., the customer uses a discount ticket, the reduction module 102 executes reduction processing (discount processing) of reducing the discount amount displayed on the discount ticket from the total price relating to the tax rate A that is the predetermined specific tax rate among the plurality of tax rates.

The amount-of-tax calculation module 103 calculate the amount of tax relating to the trade on the basis of the total price after the reduction processing by the reduction module 102 and the total price relating the tax rate B that is a tax rate other than the tax rate A.

The setting module 104 sets one of the plurality of different tax rates as the specific tax rate.

Figure 8:
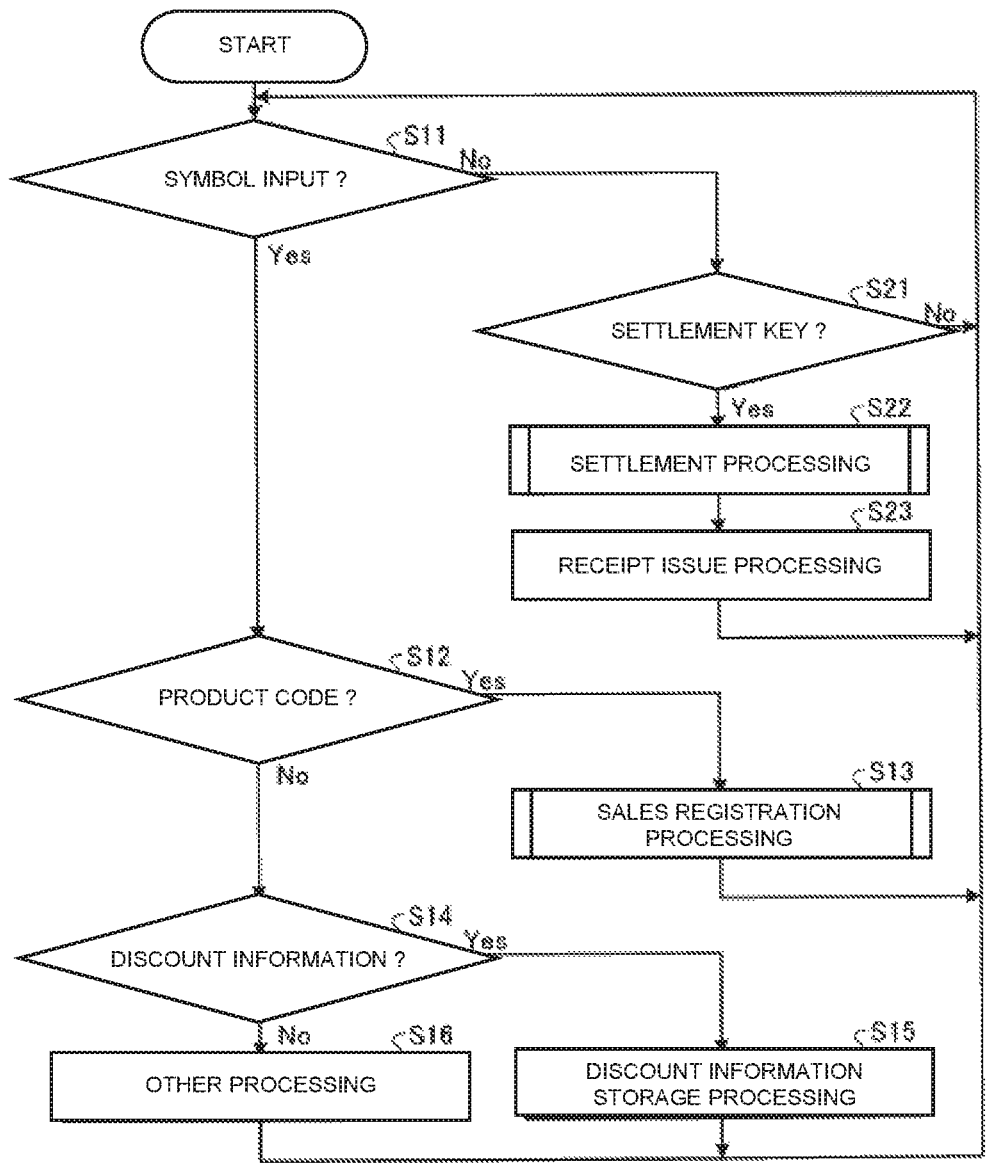
FIG. 8 is a block diagram showing control processing of the POS terminal according to this embodiment.
Figure 9:
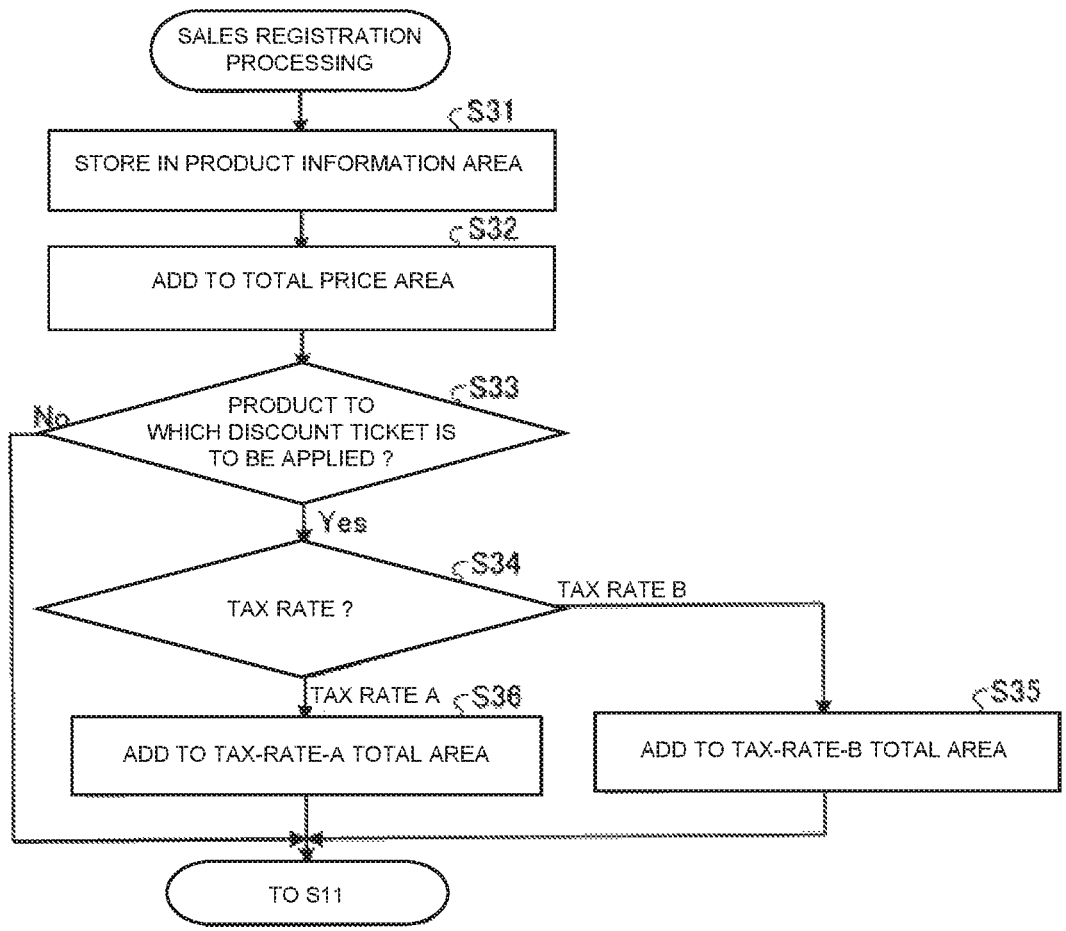
FIG. 9 is a flowchart showing sales registration processing included in control processing of the POS terminal according to this embodiment.
Figure 10:
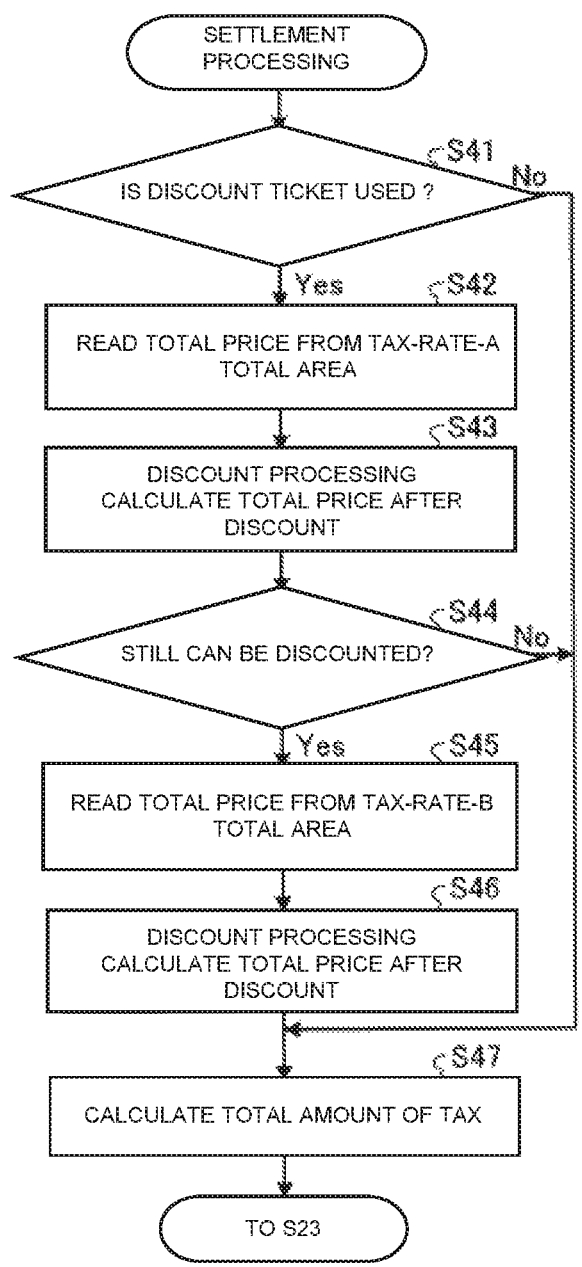
FIG. 10 is a flowchart showing settlement processing included in control processing of the POS terminal according to this embodiment.

FIG. 8 to FIG. 10 are each a flowchart showing control processing of the POS terminal 1. As shown in FIG. 8, in Step S11, the processor 11 of the controller 100 determines whether or not a symbol is input by the code reader 30, i.e., a symbol is input. In the case where the processor 11 determines that a symbol is input (Yes in Step S11), the processing of the processor 11 proceeds to Step S12. In Step S12, the processor 11 analyzes the input symbol, and determined whether or not a product code for identifying a product is included in the symbol on the basis of the analysis result. In the case where the processor 11 determines that a product code is included in the input symbol (Yes in Step S12), the processing of the processor 11 proceeds to Step S13. In Step S13, the processor 11 executes sales registration processing on the product by using the product code.

FIG. 9 is a flowchart showing sales registration processing executed by the processor 11 in Step S13. As shown in FIG. 9, in Step S31, the processor 11 acquires product information on a product identified by the product code from the product master 142 of the storage device 14 on the basis of the above-mentioned product code. Then, the processor 11 stores, in the registered product information area 1311 of the product information area 131 (RAM 13), the acquired product information in association with the product code. Next, In Step S32, the processor 11 adds the price of the product included in the acquired product information to the total price area 1314 of the product information area 131, and stores it in the total price area 1314.

Next, in Step S33, the processor 11 determines whether or not the product is a product to which a discount ticket is to be applied. Specifically, in the case where a flag "1" is stored in the discount ticket application area 1425 for the product specified by the above-mentioned product code in the product master 142, the processor 11 determines that the product identified by the above-mentioned product code is a product to which a discount ticket is to be applied (product to be reduced). Meanwhile, in the case where a flag "0" is stored in the discount ticket application area 1425 for the product specified by the above-mentioned product code in the product master 142, the processor 11 determines that the product identified by the above-mentioned product code is a product to which a discount ticket is not to be applied (product not to be reduced).

In Step S33, in the case where the processor 11 determines that the product identified by the above-mentioned product code is a product to which a discount ticket is to be applied (Yes in Step S33), the processing of the processor 11 proceeds to Step S34. In Step S34, the processor 11 determines whether the tax rate taxed on the product, which is stored in the registered product information area 1311 in Step S31, is the tax rate A or the tax rate B. The processor 11 determines the tax rate on the basis of the information of the tax rate area 1424. The information of the tax rate area 1424 is included in the product information acquired from the product master 142. Therefore, the information of the tax rate area 1424 is included in the product information stored in the registered product information area 1311 in Step S31. In the case where the information of the tax rate area 1424 included in the product information is "1", the processor 11 determines that the tax rate of the product is the tax rate A. Meanwhile, in the case where the information of the tax rate area 1424 included in the product information is "2", the processor 11 determines that the tax rate of the product is the tax rate B.

In the case where the processor 11 determines that the tax rate is the tax rate A in Step 34 (tax rate A in Step S34), the processing of the processor 11 proceeds to Step S36. In Step S36, the processor 11 (total price storage module 101) adds the price of the product included in the acquired product information to the total price that is already stored in the tax-rate-A total area 1312, and stores it in the tax-rate-A total area 1312. Meanwhile, in the case where the processor 11 determines that the tax rate is the tax rate B in Step S34 (tax rate B in Step S34), the processing of the processor 11 proceeds to Step S35. In Step S35, the processor 11 (the total price storage module 101) adds the price of the product included in the acquired product information to the total price that is already stored in the tax-rate-B total area 1313, and stores it in the tax-rate-B total area 1313. Then, the processing of the processor 11 returns to Step S11. Note that in the case where the processor 11 determines that the product identified by the above-mentioned product code is not a product to which a discount ticket is to be applied in Step S33, (No in Step S33), the processing of the processor 11 returns to Step S11.

Now, return to the description of FIG. 8. In the case where the processor 11 determines that no product code is included in the input symbol in Step S12 (No in Step S12), the processing of the processor 11 proceeds to Step S14. In Step S14, the processor 11 determines whether or not the symbol input in Step S11 includes reduction information including the reduction amount. In the case where a symbol displayed on a discount ticket is input, the processor 11 determines that the input symbol includes reduction information. In the case where the processor 11 determines that the input symbol includes reduction information (Yes in Step S14), the processing of the processor 11 proceeds to Step S15. In Step S15, the processor 11 stores reduction information in the reduction information area 1315. Then, the processing of the processor 11 returns to Step S11. Further, in the case where the processor 11 determines that the input symbol includes no reduction information (No in Step S14), the processing of the processor 11 proceeds to Step S16. In Step S16, the processor 11 executes other processing. Then, the processing of the processor 11 returns to Step S11.

Further, in the case where the processor 11 determines that no symbol is input by the code reader 30 in Step S11 (No in Step S11), the processing proceeds to Step S21. In Step S21, the processor 11 determines whether or not the settlement key 211 is operated. In the case where the processor 11 determines that the settlement key 211 is operated (Yes in Step S21), the processing of the processor proceeds to Step S22. In Step S22, the processor 11 executes settlement processing including reduction processing on the basis of the product information and the like stored in the product information area 131.

FIG. 10 is a flowchart showing settlement processing executed in Step S22. As shown in FIG. 10, in Step S41, the processor 11 determines whether or not a discount ticket is used for this trade (i.e., reduction is instructed). In the case where reduction information is stored in the reduction information area 1315, the processor 11 determines that a discount ticket is used. The reduction information is stored in the reduction information area 1315 in the processing of Step S15.

In the case where the processor 11 determines that a discount ticket is used (reduction is instructed) in the trade in Step S41 (Yes in Step S41), the processing of the processor 11 proceeds to Step S42. In Step S42, the processor 11 reads the total price of the product to be taxed with the highest tax rate A from the tax-rate-A total area 1312. Then, in Step S43, the processor 11 (reduction module 102) executes reduction processing (first reduction processing) on the basis of the read total price and the reduction amount stored in the reduction information area 1315. Then, the processor 11 calculates the total price after the reduction processing relating to the product of the tax rate A. Specifically, in the case where the read total price is not less than the reduction amount, the processor 11 calculates, by executing reduction processing of reducing the reduction amount from the read total price, the total price after the reduction processing relating the product of the tax rate A. Meanwhile, in the case where the read total price is less than the reduction amount, the processor 11 executes reduction processing of reducing, from the total price, the amount corresponding to the total price of the reduction amount, and calculates the total price as 0 yen. In this case, the reduction amount has a remaining amount that can be discounted. The remaining amount that can be discounted is a difference amount between the total price of the tax-rate-A total area 1312 and the reduction amount.

Next, in Step S44, the processor 11 determines whether or not the reduction processing can still be executed. In the case where the reduction amount is reduced from the total price and the reduction amount still has a remaining amount on which reduction processing can be executed, i.e., the total price is less than the reduction amount of the instructed reduction, the processor 11 determines that reduction processing can still be executed. In the case where the processor 11 determines that reduction processing can still be executed (Yes in Step S44), the processing of the processor 11 proceeds to Step S45. In Step S45, the processor 11 reads, from the tax-rate-B total area 1313, the total price of the product to be taxed with the tax rate B. Then, in Step S46, the processor 11 executes reduction processing (second reduction processing) on the basis of the read total price and the above-mentioned remaining amount. Then, the processor 11 calculates the total price after the reduction processing relating to the product of the tax rate B. Specifically, the processor 11 calculates, by executing reduction processing of reducing the remaining amount from the read total price, the total price after the reduction processing relating to the product of the tax rate B.

Next, in Step S47, the processor 11 (amount-of-tax calculation module 103) calculates the amount of tax relating to the trade on the basis of the total price relating to the product of the tax rate A and the total price relating to the product of the tax rate B. In this case, the processor 11 calculates, for the product of the tax rate on which reduction processing is executed, the amount of tax on the basis of the total price after the reduction processing. Then, the processing of the processor 11 proceeds to Step S23.

That is, assuming that a reduction amount by a discount ticket is Z, the total price of a product relating to the tax rate A is X, the total price of a product relating to the tax rate B is Y, and the amount of tax calculated in Step S47 is P, the amount of tax P is obtained by the following formula.

$$P = (X-Z) \times A + Y \times B$$

Further, in the case where the processor 11 determines that reduction processing is not possible in Step S44 (No in Step S44), the processing of the processor 11 proceeds to Step S47. Further, also in the case where the processor 11 determines that a discount ticket is not used for this trade in Step S41 (No in Step S41), the processing of the processor 11 proceeds to Step S47.

Now, calculation of the amount of tax in Step S47 will be specifically described.

(1) In the case where a discount ticket is used and the total price stored in the tax-rate-A total area 1312 is not less than the reduction amount (i.e., Yes in Step S41 and No in Step S44), the amount of tax relating the total price of the product of the tax rate A by multiplying the total price after the reduction processing calculated in the processing of Step S43 by the tax rate A. Further, the amount of tax relating to the total price of the product of the tax rate B is calculated by multiplying the total price of the product of the tax rate B (total price stored in the tax-rate-B total area 1313) by the tax rate B. The total value of the calculated amounts of tax is the amount of tax calculated in Step S47. This amount of tax is the amount of tax calculated on the basis of the total price after the reduction processing by the processor 11 (reduction module 102) and the total price of the product of the tax rate B on which the above-mentioned reduction processing is not executed.

(2) In the case where a discount ticket is used and the total price stored in the tax-rate-A total area 1312 is less than the reduction amount (i.e., Yes in Step S41 and Yes in Step S44), the total price after the reduction processing (first reduction processing) calculated in the processing of Step S43 is 0 yen. Therefore, the amount of tax of the total price after the reduction processing calculated in the processing of Step S43 is calculated as 0 yen. Further, the amount of tax relating to the total price of the product of the tax rate B is calculated by multiplying the total price after the reduction processing (second reduction processing) calculated in the processing of Step S46 by the tax rate B. The total value of the calculated amounts of tax is the amount of tax calculated in Step S47. This amount of tax is the amount of tax calculated on the basis of the total price of the product of the tax rate A after the reduction processing (first reduction processing) by the processor 11 (reduction module 102) and the total price of the product of the tax rate B after the reduction processing (second reduction processing).

(3) In the case where no discount ticket is used (i.e., No in Step S41), the amount of tax relating to the total price of the product of the tax rate A is calculated by multiplying the total price stored in the tax-rate-A total area 1312 by the tax rate A. Further, the amount of tax relating to the total price of the product of the tax rate B is calculated by multiplying the total price stored in the tax-rate-B total area 1313 by the tax rate B. The total value of the calculated amounts of tax is the amount of tax calculated in Step S47.

Now, return to the description of FIG. 8. Next, in Step S23, the processor 11 issues a receipt on which product information and settlement information (including the amount of tax relating to the tax rate A, the amount of tax relating to the tax rate B, and the total amount of tax) of the product on which settlement processing is executed are printed, by driving the printing device 24.

As described above, in this embodiment, in the case where a discount ticket is used (Yes in Step S41), reduction processing (first reduction processing) of a reduction amount (discount amount by a price reduction ticket, a discount ticket, and the like) is executed on the total price of the product relating to the tax rate A (predetermined specific tax rate) first. Therefore, even in the case where a price reduction ticket and a discount ticket are used when purchasing a plurality of products with different tax rates by a customer, it is possible to efficiently calculate the amount of tax.

Further, in this embodiment, in the case where a discount ticket is used, reduction processing (first reduction processing) of a reduction amount (discount amount by a price reduction ticket and a discount ticket) is executed on the total price of the product relating to the highest tax rate A (predetermined specific tax rate) first. Therefore, it is possible to reduce the amount of tax paid by the customer.

Further, in this embodiment, in the case where a discount ticket is used, reduction processing (first reduction processing) of a reduction amount (discount amount by a price reduction ticket, a discount ticket, and the like) is executed on the total price of the product relating to the tax rate A (predetermined specific tax rate) first. Then, in the case where the reduction amount still has a remaining amount after this reduction processing, reduction processing (second reduction processing) of the remaining amount of the reduction amount is executed on the total price relating to the tax rate B. Therefore, it is possible to make maximum use of the reduction amount by the discount ticket and the like.

Hereinafter, a first modification of this embodiment will be described. In the above-mentioned embodiment, in the settlement processing, reduction processing is executed on the product of the highest tax rate A first. The first modification is different from the above-mentioned embodiment in that the specific tax rate for executing reduction processing is set first in the settlement processing. In the first modification, one tax rate among the plurality of tax rates is input in the server 2. The server 2 transmits the input tax rate to the POS terminal 1. The POS terminal 1 receives the tax rate via the communication device 26. The processor 11 (setting module 104) sets the tax rate by storing the received tax rate as the specific tax rate in the storage device 14 or the like.

Figure 11:
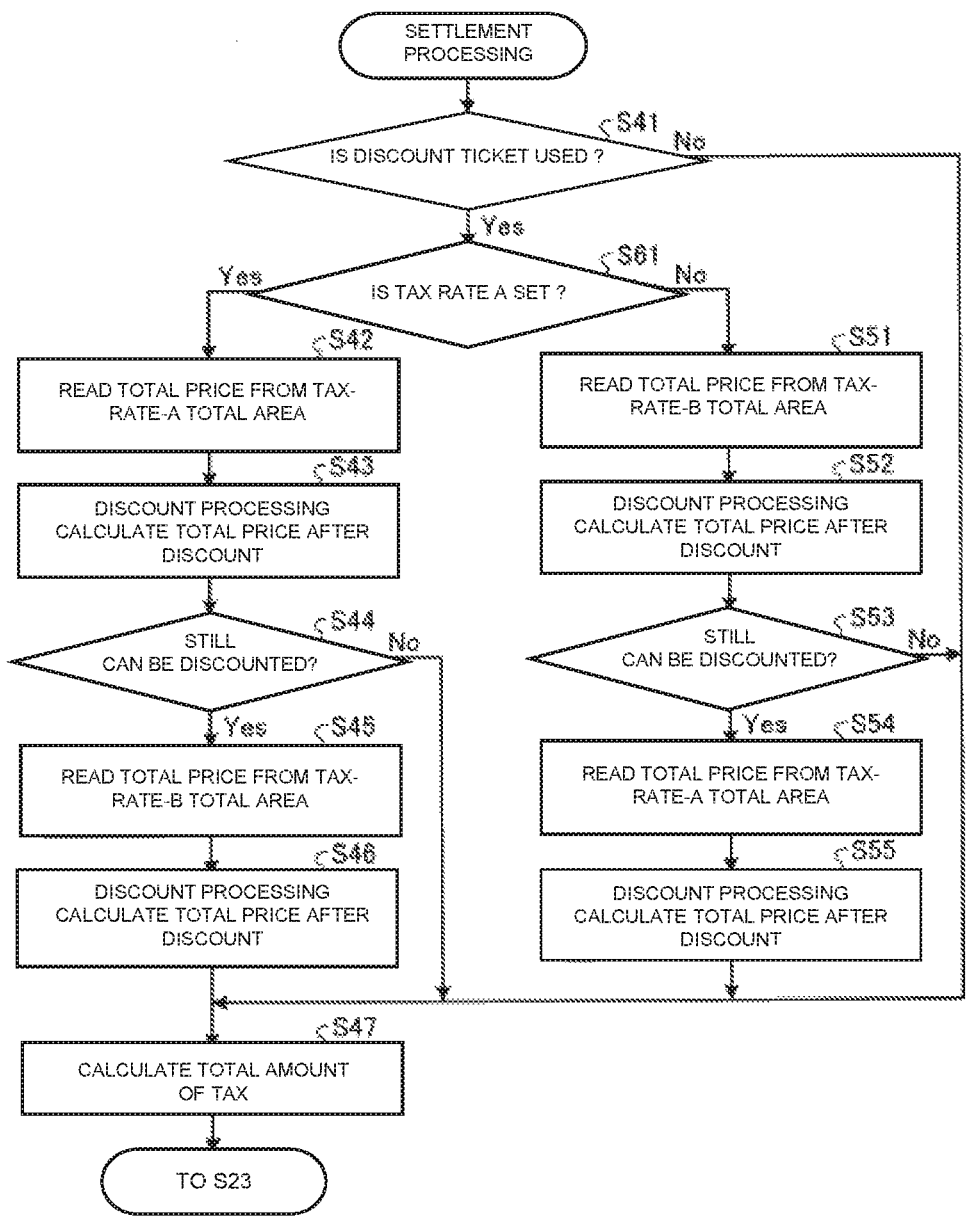
FIG. 11 is a flowchart showing settlement processing of a POS terminal according to a first modification of this embodiment.

FIG. 11 is a flowchart showing settlement processing of the POS terminal 1 according to the first modification. In the first modification shown in FIG. 11, the same processing as that in the above-mentioned embodiment will be denoted by the same reference symbols as that in FIG. 10, and description thereof will be omitted or simplified. Note that in the first modification, the processor 11 executes processing corresponding to the processing shown in FIG. 8 and the processing shown in FIG. 9.

As shown in FIG. 11, in the case where the processor 11 determines that a discount ticket is used in Step S41 (Yes in Step S41), the processing of the processor 11 proceeds to Step S61. In Step S61, the processor 11 determines whether or not the tax rate A is set as the tax rate for executing reduction processing first, on the basis of the tax rate information stored in the storage device 14. In the case where the processor 11 determines that the tax rate A is set (Yes in Step S61), the processor 11 executes processing of Step S42 to S47.

Further, in the case where the processor 11 determines that the tax rate A is not set in Step S61 (No in Step S61), the processing of the processor 11 proceeds to Step S51. In Step S51, the processor 11 determines that the tax rate B is set, and read the total price of the product to be taxed with the tax rate B from the tax-rate-B total area 1313. Then, in Step S52, the processor 11 executes reduction processing on the basis of the read total price and the reduction amount stored in the reduction information area 1315. Further, the processor 11 calculates the total price after the reduction processing relating to the product of the tax rate B. Specifically, in the case where the read total price is not less than the reduction amount, the processor 11 calculates, by executing reduction processing (first reduction processing) of reducing the reduction amount from the read total price, the total price after the reduction processing relating to the product of the tax rate B. Meanwhile, in the case where the read total price is less than the reduction amount, the processor 11 executes reduction processing (first reduction processing) of reducing, from the total price, the amount corresponding to the total price of the reduction amount, and calculates the total price as 0 yen. In this case, the reduction amount has a remaining amount that can be discounted. The remaining amount that can be discounted is a difference amount between the total price of the tax-rate-B total area 1313 and the reduction amount.

Next, in Step S53, the processor 11 determines whether or not the reduction processing can still be executed. In the case where the reduction amount is reduced from the total price and the reduction amount still has a remaining amount on which reduction processing can be executed, the processor 11 determines that reduction processing can still be executed. In the case where the processor 11 determines that reduction processing can still be executed (Yes in Step S53), the processing of the processor 11 proceeds to Step S54. In Step S54, the processor 11 reads, from the tax-rate-A total area 1312, the total price of the product to be taxed with the tax rate A. Then, in Step S55, the processor 11 executes reduction processing (second reduction processing) on the basis of the read total price and the above-mentioned remaining amount. Then, the processor 11 calculates the total price after the reduction processing relating to the product of the tax rate A. Specifically, the processor 11 calculates, by executing reduction processing of reducing the remaining amount from the read total price, the total price after the reduction processing relating to the product of the tax rate B. Then, the processor 11 executes the processing of Step S47. Further, in the case where the processor 11 determines that reduction processing is not possible in Step S53 (No in Step S53), the processor 11 executes the processing of Step S47. In such a first modification, the processing of Step S43 and the processing of Step S52 correspond to the processing of the reduction module 102.

According to such a first modification, the tax rate for executing reduction processing first (the tax rate A or the tax rate B in this embodiment) can be arbitrarily set and stored. Therefore, even in the case where a price reduction ticket and a discount ticket are used when purchasing a plurality of products with different tax rates, it is possible to efficiently calculate the amount of tax. Further, according to the first modification, it is possible to change the specific tax rate for executing reduction processing first as necessary and store it.

Hereinafter, a second modification of this embodiment will be described. In the above-mentioned embodiment and the first modification, reduction processing (first reduction processing) is executed on the total price relating to any of the tax rates first. In the second modification, the reduction amount is distributed proportionally on the basis of the ratio of the respective total prices of products to be traded, and reduction processing is executed on the respective total prices of the products. This point is different from the above-mentioned embodiment and the first modification. Note that in the second modification, the processor 11 executes processing corresponding to the processing shown in FIG. 8 and the processing shown in FIG. 9.

Figure 12:
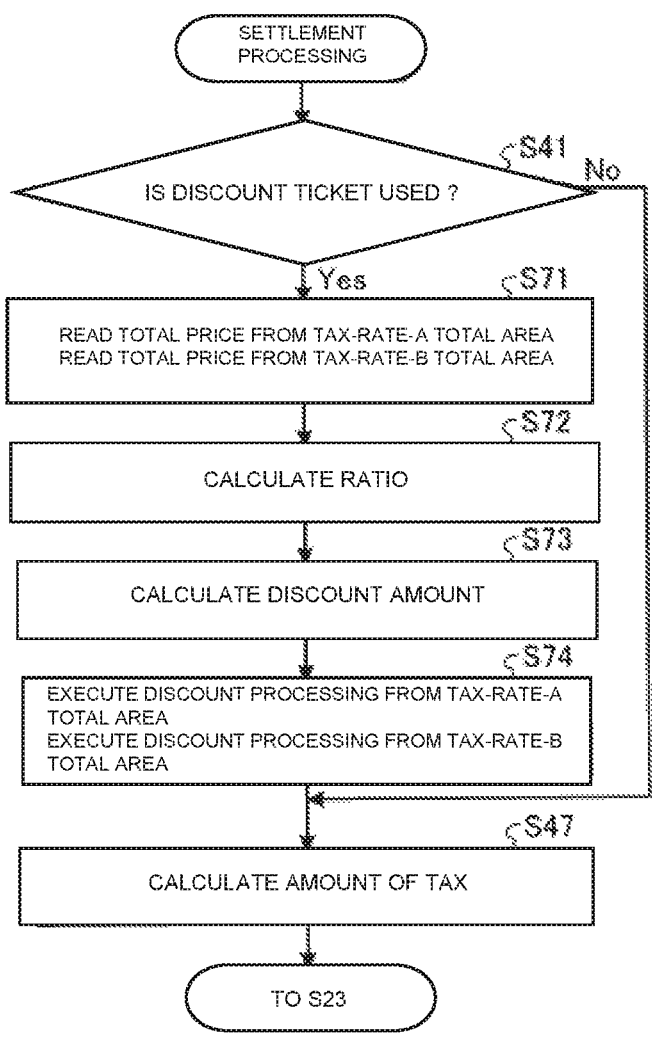
FIG. 12 is a flowchart showing settlement processing of a POS terminal according to a second modification of this embodiment.

FIG. 12 is a flowchart showing flow of settlement processing of the POS terminal 1 according to the second modification of the above-mentioned embodiment. In the second modification shown in FIG. 12, the same processing as that in this embodiment will be denoted by the same reference symbols as that in FIG. 10, and description thereof will be omitted or simplified.

As shown in FIG. 12, in the case where the processor 11 determines that a discount ticket is used in Step S41 (Yes in Step S41), the processing of the processor 11 proceeds to Step S71. In Step S71, the processor 11 reads the total price of the product to be taxed with the tax rate A from the tax-rate-A total area 1312. Further, the processor 11 reads the total price of the product to be taxed with the tax rate B from the tax-rate-B total area 1313.

Next, in Step S72, the processor 11 calculates the ratio between the read total price of the product to be taxed with the tax rate A and the read total price of the product to be taxed with the tax rate B. Next, in Step S73, the processor 11 calculates the reduction amount (discount amount) relating to the product of the tax rate A, which is obtained by proportionally distributing, with the calculated ratio, the reduction amount included in the reduction information such as a discount ticket stored in the reduction information area 1315. Further, the processor 11 calculates the reduction amount (discount amount) relating to the product of the tax rate B, which is obtained by proportionally distributing the reduction amount with the calculated ratio. Next, in Step S74, the processor 11 calculates, by reducing the reduction amount relating to the product of the tax rate A from the total price of the product to be taxed with the tax rate A, the total price after discount (reduction processing) relating to the product of the tax rate A. Further, the processor 11 calculates, by reducing the reduction amount relating to the product of the tax rate B from the total price of the product to be taxed with the tax rate B, the total price after discount (reduction processing) relating to the product of the tax rate B. Then, the processor 11 executes the above-mentioned processing of Step S47.

That is, assuming that a reduction amount by a discount ticket is Z, the total price of a product relating to the tax rate A is X, the total price of a product relating to the tax rate B is Y, and the amount of tax calculated in Step S47 is P, the amount of tax P is obtained by the following formula.

$$P=(X-(Z\times(X/(X+Y))))\times A+(Y-(Z\times(Y/(X+Y))))\times B$$

According to such a second modification, the processor proportionally distributes the reduction amount on the basis of the ratio between the total price of the product to be taxed with the tax rate A and the total price of the product to be taxed with the tax rate B, and executes reduction processing on the respective total prices. Therefore, even in the case where a price reduction ticket and a discount ticket are used when purchasing a plurality of products with different tax rates, it is possible to efficiently calculate the amount of tax. Further, since the discount amount is distributed proportionally and reduction processing is executed on the respective total prices of the products with different taxes, it is possible to give fairness to customers.

For example, although two kinds of tax rates of the tax rate A and the tax rate B are used for description in this embodiment, the first modification, and the second modification, the present disclosure is not limited thereto, and is applicable to discounting of products with two or more different types of tax rates.

Further, although reduction processing is executed first on the total price of the product to which the tax rate A is applied in this embodiment, the priority of executing reduction processing may be determined in advance for each tax rate and reduction processing may be executed in the order of the tax rate with a higher priority. In this case, it only needs to set the priority of executing reduction processing of the tax rate A to be higher than that of the tax rate B.

Further, in this embodiment, the first modification, and the second modification, whether or not a discount ticket can be used, i.e., it is a product to be reduced is stored for each product. Meanwhile, it is also possible to store, in a product category unit for classifying a plurality of products, whether or not a discount ticket can be used. In the case where it is stored for each product category that a discount ticket can be used, the discount ticket can be used for all products included in the product category.

Further, although the tax rate is set via the operation panel 41 of the server 2 in the first modification, the tax rate may be selected via the POS terminal 1.

Further, in this embodiment, the first modification, and the second modification, the reduction amount displayed on a discount ticket is reduced from the total price of the product. Meanwhile, for example, corresponding to the discount ticket, a predetermined amount of money may be reduced from the total price of the product.

Further, although the product relating to the tax rate B is a target for the reduced tax rate in this embodiment, the first modification, and the second modification, the product relating to the tax rate B may be not a product to which the reduced tax rate is applied but a product with a different tax rate.

Note that the program executed by the information processing apparatus of this embodiment is recorded in an installable format file or an executable format file in a computer readable recording medium such as a CD-ROM, a flexible disk (FD), a CD-R, and a DVD (Digital Versatile Disk) and provided.

Further, the program executed by the information processing apparatus of this embodiment may be stored in a computer connected to a network such as the Internet, downloaded via the network, and provided. Further, the program executed by the information processing apparatus of this embodiment may be provided or distributed via a network such as the Internet.

Further, the program executed by the information processing apparatus of this embodiment may be preinstalled in the ROM or the like and provided.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form the methods and systems described herein may be made without departing from the sprit of the inventions. The accompanying claims and their equivalents are intended to cover such forms or modifications as would fall within the scope and spirit of the inventions.

What is claimed is:

1. A point-of-sale (POS) terminal that processes information on one or more products to be traded in a transaction, comprising:
   an optical code reader configured to optically read a product code of a product to register the product for trade and read, from a medium, reduction information including a reduction amount to reduced from a total price of one or more products to be traded in the transaction;
   a receipt printer;
   a storage device that stores a product master indicating a price, a tax rate, and eligibility of price discount for each of products for sale;
   a memory including
      a first total area that stores a total price of one or more registered products that are at a first tax rate, and
      a second total area that stores a total price of one or more registered products that are at a second tax rate, the second tax rate being lower than the first tax rate, and
      a reduction information area that stores the reduction information read from the medium by the code reader; and
   a processor configured to
      upon the code reader reading a product eligible for price discount, determine a price and a tax rate of the product eligible for price discount with reference to the product master,
      when the determined tax rate is the first tax rate, add the determined price of the product eligible for price discount to the total price in the first total area,
      when the determined tax rate is the second tax rate, add the determined price of the product eligible for price discount to the total price in the second total area,
      upon the code reader reading the reduction information, add the reduction information to the reduction information area,
      upon settlement processing being instructed, determine whether or not reduction information is stored in the reduction information area,
      upon determining that reduction information is stored in the reduction information area, proportionally distribute the reduction amount included in the reduction information stored in the reduction information area in accordance with a ratio between the total price stored in the first total area and the total price stored in the second total area, and execute reduction processing of reducing the proportionally distributed reduction amount from the total price stored in the first total area and the total price stored in the second total area,
      calculate an amount of tax of one or more products at the first tax rate, that are to be traded in the transaction on the basis of the total price stored in the first total area after the reduction processing and an amount of tax of one or more products at the second tax rate, that are to be traded in the transaction on the basis of the total price stored in the second total area after the reduction processing, and
      control the receipt printer to print a receipt including settlement information that includes the calculated amount of tax of the one or more products at the first tax rate and the calculated amount of tax of the one or more products at the second tax rate.

* * * * *